UNITED STATES PATENT OFFICE 2,167,325

AGENTS OF CAPILLARY ACTIVITY

Adolf Steindorff, Gerhard Balle, and Paul Heimke, Frankfort-on-the-Main, and Karl Horst, Hofheim-in-Taunus, Germany, assignors to I. G. Farbenindustrie Aktiengesellschaft, Frankfort-on-the-Main, Germany No Drawing. Application November 26, 1935, Serial No. 51,678. In Germany December 5, 1934

3 Claims. (Cl. 260—514)

The present invention relates to agents of capillary activity.

We have found that agents of strong capillary activity are obtainable from bodies of the general formula: R—O—R$_1$ wherein R represents an hydroaromatic hydrocarbon radical containing as a substituent at least one aliphatic, or araliphatic or cycloaliphatic radical having more than three carbon atoms, and R$_1$ represents an aliphatic radical carrying at least one acid salt-forming group, especially from their water-soluble salts.

The said agents are used with advantage in all cases where a strong capillary action and capacity for diminishing surface tension is desired, for instance, in the textile industry as cleaning agents, as wetting and penetration agents in the treatment and dyeing of textiles, as emulsifying and dispersing agents for substances insoluble in water, such as oils, fats and waxes, as wetting agents for finely divided insoluble solid substances, such as, for instance, dyestuff powders. The products, which contain a sulfo-group as the acid salt-forming group, have tanning properties and are capable of dissolving otherwise insoluble ingredients of natural tanning matters. They may, therefore, be used with advantage in the leather industry.

The products may be used either alone or in the form of more or less concentrated aqueous pastes or solutions. They may contain water-soluble inorganic salts, for instance, those which prevent the precipitation of the salts that cause the hardness of water. They may also be used in admixture with bleaching agents or other substances of capillary action.

The products of the present invention may easily be prepared according to known methods. As parent materials there may be used, in the first place, alkylated or cycloalkylated hydraromatic hydroxy-compounds which may be prepared according to various methods such as, for instance, the alkylated or cycloalkylated hydroaromatic alcohols obtainable by nuclear hydrogenation from para-n-butylphenol, isoamylcresols, isohexylxylenols, isododecylnaphthols, ortho- and para-benzyl-phenol, para-cyclohexyl-phenol.

By causing these hydroaromatic hydroxyl compounds to react with halogen fatty acids or halogen alkyl-sulfonic acids there are obtained the compounds of the above general formula. They may also be prepared by causing the said hydroxyl compounds to react with halogen-hydrins of polyhydric aliphatic alcohols or with alkylene oxides and transforming, by means of a polybasic mineral acid containing oxygen, such as sulfuric acid or phosphoric acid, the introduced hydroxyl group into the acid ester.

The following examples serve to illustrate the invention but they are not intended to limit it thereto.

(1) Equal parts of the sodium salt of iso-octylcyclohexyloxy acetic acid of the formula:

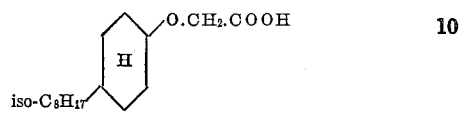

and sodium carbonate are cautiously pulverized and mixed. A powder is obtained which is easily soluble in water and whose solution of 0.4% strength has a good cleaning action.

(2) The sodium salts of the octylxylenyloxy-propyl ether sulfonic acids obtainable by the reaction of the sodium salts of acrylxylenols with chloropropane-sulfonic acid

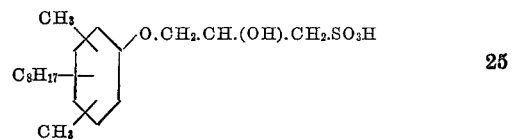

are, in the form of their aqueous solutions, wetting agents which may be used for all baths for treating textiles.

The free acids may be used for carbonising wool.

By using instead of the mixture of the octyl-xylenols the mixture of iso-octyl-hexahydroxy-lenols there are obtained the octyl-hexahydroxy-lenyl-oxypropyl ether sulfonic acids and the sodium salts thereof, respectively.

The free acids have the formula:

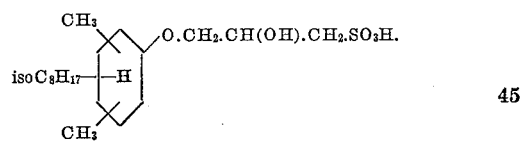

(3) In tanning sole leather, about 5–10 per cent of cyclo-hexyl-naphthoxy-ethane-sulfonic acid, calculated upon the concentrated extract, are added to a quebracho liquor. The liquor is utilized to a larger extent and the leather is tanned more quickly throughout.

(4) A caustic soda solution of 30° Bé. containing per liter 1 gram of the sodium salt of para-butylcyclohexyloxy-acetic acid

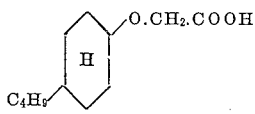

in a dissolved state, is used for mercerizing cotton fabric. A quicker wetting throughout and a quicker shrinking is obtained than in the case when pure caustic soda solution is used.

The same good effect may be obtained by using the ethanolamine salt of the acid sulfuric acid ester of the butylcyclohexylglycolic ether which has the formula:

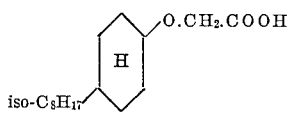

We claim:

1. Agents of capillary activity consisting essentially of para-iso-octylcyclohexyl-oxy-acetic acid of the formula:

2. Agents of capillary activity consisting essentially of compounds of the general formula $R.O.R_1.X$ wherein R represents a member of the group consisting of the cyclohexyl radical and methyl-cyclohexyl radicals, the radical being substituted in the nucleus at least once by a member selected from the group consisting of aliphatic and cycloaliphatic radicals having from 8 to 18 carbon atoms, $R_1$ represents an aliphatic hydrocarbon radical, and X stands for a member of the group consisting of $COOH$, $SO_3H$ and $OSO_3H$.

3. Agents of capillary activity consisting essentially of compounds of the general formula $R.O.R_1.X$ wherein R represents a member of the group consisting of the cyclohexyl radical and methyl-cyclohexyl radicals, the radical being substituted in the nucleus at least once by a member selected from the group consisting of aliphatic and cycloaliphatic radicals having from 8 to 18 carbon atoms, $R_1$ represents an aliphatic hydrocarbon radical, and X stands for a water-soluble salt of a member of the group consisting of $COOH$, $SO_3H$ and $OSO_3H$.

ADOLF STEINDORFF.
GERHARD BALLE.
PAUL HEIMKE.
KARL HORST.